United States Patent [19]

Davis, Jr.

[11] 4,331,244

[45] May 25, 1982

[54] MODULAR NUCLEAR FUEL ASSEMBLY RACK

[75] Inventor: C. Fred Davis, Jr., Lynchburg, Va.

[73] Assignee: The Babcock & Wilcox Company, New Orleans, La.

[21] Appl. No.: 146,727

[22] Filed: May 2, 1980

[51] Int. Cl.³ .......................... A47F 7/00; A47B 47/00
[52] U.S. Cl. .................................... 211/194; 211/182; 312/257 R
[58] Field of Search .............. 211/189, 194, 206, 195, 211/182, 183; 312/108, 257

[56] References Cited

U.S. PATENT DOCUMENTS

| | | | |
|---|---|---|---|
| 758,331 | 4/1904 | Ohnstrand | 312/257 R |
| 1,251,719 | 1/1918 | Wege | 312/257 R |
| 1,509,853 | 9/1924 | Vance | 312/257 R |
| 3,042,473 | 7/1962 | Vincens | 312/257 R |
| 3,661,434 | 5/1972 | Alster | 312/257 R |
| 4,192,562 | 3/1980 | Bishoff | 211/189 |
| 4,199,070 | 4/1980 | Magnussen | 211/194 |

Primary Examiner—Reinaldo P. Machado
Attorney, Agent, or Firm—D. Anthony Gregory; Robert J. Edwards

[57] ABSTRACT

A modular nuclear fuel assembly rack constructed of an array of identical cells, each cell constructed of a plurality of identical flanged plates. The unique assembly of the plates into a rigid rack provides a cellular compartment for nuclear fuel assemblies and a cavity between the cells for accepting neutron absorbing materials thus allowing a closely spaced array. The modular rack size can be easily adapted to conform with available storage space. U-shaped flanges at the edges of the plates are nested together at the intersection of four cells in the array. A bar is placed at the intersection to lock the cells together.

1 Claim, 2 Drawing Figures

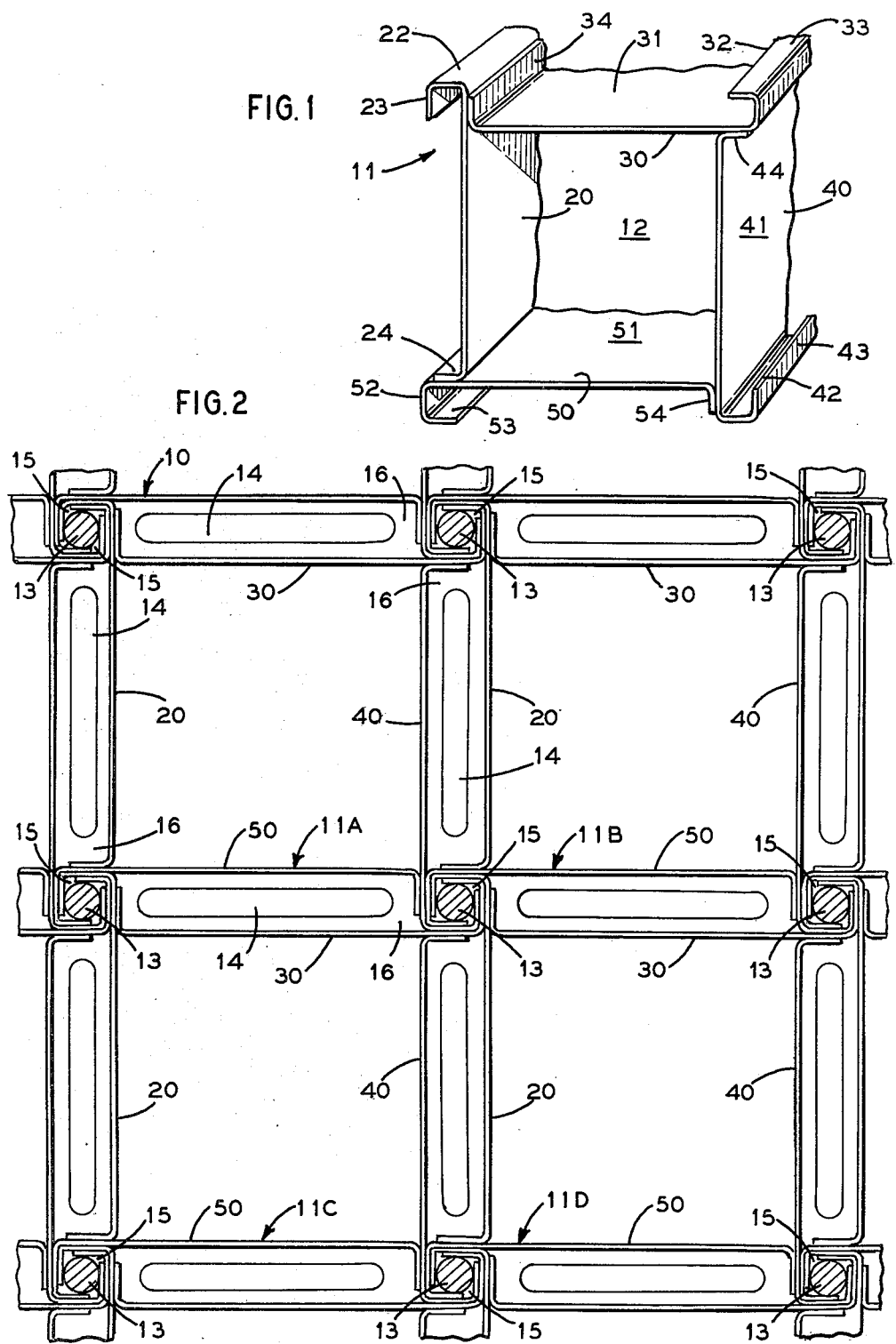

MODULAR NUCLEAR FUEL ASSEMBLY RACK

BACKGROUND

The present invention relates to nuclear fuel and in particular to a rack for the storage of nuclear fuel assemblies.

Fuel for commercial nuclear fission reactors typically includes a stack of enriched uranium dioxide pellets contained with a capped tube collectively called a fuel rod. A fuel assembly includes about 200 to 300 fuel rods held in a square array by spacer grids and upper and lower end fittings.

It is common for nuclear fuel assemblies, when not in position in the reactor core pressure vessel, to be stored in pools of water at the nuclear reactor site or at another site. Fuel assemblies are stored both before and after they are used to produce energy in the reactor.

Typically, nuclear fuel assemblies are stored under water at reactor sites in some sort of rack structure, spaced from each other a sufficient distance to preclude a sustained nuclear fission chain reaction. One type of rack uses a pair of horizontal frames supporting the fuel assembly at the top and bottom in a vertical attitude. In another the fuel assemblies are inserted into cans. The top and bottom ends of the cans are supported by some form of horizontal frame. These types of structures have significant flexibility, a disadvantage in that it permits them to respond to seismic or other excitations raising the possibility of damage to the stored fuel assemblies and potential leakage of radioactive materials therefrom.

The lack of nuclear fuel reprocessing facilities has forced many utilities and fuel assembly manufacturers to increase the number of fuel assemblies stored in their storage pools. The most common way to increase capacity of a storage pool is to use a more closely spaced fuel assembly array. A sustained nuclear fission chain reaction is precluded in the closely spaced array by positioning a neutron absorbing material between the stored fuel assemblies. One such nuclear fuel assembly storage rack consists of four identical plates joined in a novel arrangement to form a nuclear fuel assembly storage cell. A number of these storage cells can be joined in an array to form a modular rack structure of variable array size depending on the individual plant application and needs.

The prior art storage cell is made of stainless steel plates which can be assembled on a mandrel to achieve required dimensional control and square corners on the inside of the cell. The plates can be joined together by either riveting or welding the easily accessible flange areas. Since the plates are identical, the advantages of parts standardization are present. Material procurement, tooling, and fabrication are all simplified.

The shape of the plates and the arrangement of cells create a cavity between adjacent cell walls into which the neutron absorbing material can easily be placed.

The cells can be joined together to form a stiff array to permit the natural frequency of the structure to be made sufficiently high thus avoiding large seismic response. Seismic loads that are generated can be carried from cell to cell, rather than through an external framework, reducing the amount of structural steel needed. The rack structure can be designed to be free standing; i.e.: no braces between rack and pool walls thus eliminating structural steel bracing. A disadvantage of this particular rack is the method of interattaching the cells by welding or riviting or some other permanent means.

The present invention is a nuclear fuel assembly storage rack consisting of four identical plates joined to form a storage cell as in the prior art rack, however, the improvement lies in the means of interattachment. The plates have a U-shaped flange at their edge whereas the prior art utilized an L-shaped flange. When four cells are placed together with a U-shaped flange nested together, the cells can be rigidly interconnected by placing a bar through the space formed by the nested flanges. Thus, no welding or riviting is required and the rack can be disassembled simply by removing the bar.

It is an object of the invention to provide a nuclear fuel assembly storage rack.

A further object of the present invention is a storage rack utilizing a single standardized structural part resulting in lower unit fabrication and reduced tooling costs.

Another object of the invention is a storage rack yielding the foregoing advantages and which is simple to fabricate, thereby reducing welds or riveting, simplifying dimensional controls and reducing inspections.

Another object of the invention is a storage rack yielding the foregoing advantages and which is modular in construction and thus may be easily adjusted to any storage pool configuration or plant arrangement.

Yet another object of the invention is a storage rack having cells that can be interconnected by inserting a bar through interlacing corner portions of the cells.

Other objects and advantages of the present invention will be readily apparent from the following description and drawings which illustrate the preferred embodiment of the invention.

SUMMARY OF THE INVENTION

The present invention involves a nuclear fuel assembly storage rack including a plurality of identical plates affixed together to form fuel assembly storage cells. The cells are arranged in an array and interengaged to form the storage rack. The interengagement is effected by longitudinally inserting a bar through nested U-shaped flanges of adjacent plates.

BRIEF DESCRIPTION OF THE DRAWINGS

FIG. 1 is a partial perspective view of the end of a nuclear fuel assembly storage cell of the preferred embodiment of the invention.

FIG. 2 is a partial plan view of a nuclear fuel assembly storage rack according to the preferred embodiment of the invention.

DESCRIPTION OF THE PREFERRED EMBODIMENT

Refer now to FIG. 1, wherein the end of an elemental nuclear fuel assembly cell 11 is shown. Cell 11 is constructed from four identical stainless steel plates 20, 30, 40 and 50. Each of plates 20, 30, 40 and 50 have an elongated rectangular wall 21, 31, 41 and 51 respectively and a left tab 22, 32, 42, and 52 and a right tab 24, 34, 44, and 54 respectively extending perpendicularly therefrom toward the rear thereof.

The structure described to this point is the structure of the prior art. The present invention lies in the novel addition of left tab extension 23, 33, 43 and 53 extending from the edges of left tab 22, 32, 42 and 52 respectively toward the right of plates 21, 31, 41, and 51 respectively in planes parallel thereto. As discussed in detail below, the left tab extension enable simple nondestructive interlocking of the cells.

Plates 20, 30, 40 and 50 are interattached as shown in FIG. 1 to form an elemental cell 11 having a storage compartment 12 for storing a nuclear fuel assembly (not shown). Note that the front of each plate 20, 30, 40 and 50 faces the interior of cell 11.

The terms left, right, front and rear used hereinafter are relative to each individual plate to define the structure thereof, and for clarity should not be considered descriptive of the left, right, front or rear of cell 11 or rack 10. To assemble cell 11, plate 30 is positioned longitudinally parallel to and transversely rotated ninety degrees clockwise with respect to plate 20. Right tab 34 is attached by riveting or spot welding or some other suitable means to the front surface of wall 21 at the left side of wall 21.

Plate 40 is positioned longitudinally parallel to and rotated transversely ninety degrees clockwise with respect to plate 30. Right tab 44 is attached by riveting or spot welding or other suitable means to the front surface of wall 31 and at the left side of wall 31.

Plate 50 is positioned longitudinally parallel to and rotated transversely ninety degrees clockwise with respect to plate 40. Right tab 54 is attached by riveting or spot welding or other suitable means to the front surface of wall 41 at the left side of wall 41.

Right tab 24 is attached by riveting or spot welding or other suitable means to the front surface of wall 51 at the left side of wall 51.

Plates 20, 30, 40 and 50 may be assembled on a mandrel (not shown) to achieve required dimensional control and square corners on the insides of cell 11.

Refer now to FIG. 2, there being shown a nuclear fuel assembly storage rack 10 consisting of an array of identical cells 11a, 11b, 11c, and 11d, and portions of other cells not numbered but also being identical therewith. The cells are arranged longitudinally parallel to each other and in a square array as shown in FIG. 2.

Left tab 52 of cell 11b is positioned at the rear surface and at the left side of plate 41 of cell 11a. Left tab extension 53 of cell 11b is nested against the right surface of left tab 42 of cell 11a.

Similarly, left tab 52 of cell 11a is positioned at the rear surface and at the left side of plate 41 of cell 11c. Left tab extension 53 of cell 11a is nested against the right surface of left tab 42 of cell 11c.

Cell 11c is positioned relative to cell 11d, and cell 11d positioned relative to cell 11b in a similar manner. By so positioning the cells, they may be interconnected by inserting bar 13 into the common space 15 defined by the tab extensions 23, 33, 43 and 53.

By joining the plates 20, 30, 40 and 50 as above described to form cells 11 and by joining adjacent cells 11a, 11b, 11c and 11d as described, cavities 16 are formed between plate 40 of cell 11a and plate 20 of cell 11b and similarly between other cells. Neutron absorbing material 14, typically a boron compound, may be placed in cavities 16 thereby positioning material 14 between nuclear fuel assemblies (not shown) stored in the cells to absorb neutrons and to preclude the occurrence of a sustained nuclear fission reaction.

It is now readily apparent from the above description and the drawings how cells 11a, 11b, 11c and 11d are interattached to each other and moreover how a storage rack 10 of any number of cells 11 may be constructed in any size or shape array.

Upon assembly of rack 10, cavity 16 will be present between each pair of cells 11. Note that the size of the compartment 12 and cavity 16 depend upon the dimensions of identical plates 20, 30, 40 and 50, and the walls and tabs thereof.

Appropriate lead-in guide structure (not shown) to preclude spacer grid hangup during loading of the fuel assemblies into the rack is provided. Additionally, appropriate fittings (not shown) are provided for bearing the weight of the fuel assemblies and to keep them off the storage pool floor. These features being within the capabilities of one ordinarily skilled in the art are incidental to the invention and therefor excluded from detailed description.

Note that in the above description of the preferred embodiments stainless steel is used as the plate material, however, the invention is not limited thereto and any adequate material may be used.

Note further that as shown, bar 13 has a circular cross-section, however, the invention is not limited thereto. Bar 13 may be any suitable shape including rectangular, I-beam and others. Bar 13 may extend the full length of space 15, or may extend only partially. Bar 13 may include a number of short partial lengths and still come within the scope of the invention as claimed below.

Also, it is not necessary that the tabs or tab extension comprise a continuous material. Breaks in the material are permissable as long as the structural integrity of the rack is maintained and rigidity remains within acceptable design limits.

The above-described description and drawings are only illustrative of a preferred embodiment which achieves the objects, features and advantages of the present invention, and it is not intended that the present invention be limited thereto.

What is claimed as new and desired to be secured by Letters Patent of the United States is:

1. A rack comprising:
   a plurality of elongated plates each having a front side, a back side, a left elongated edge and a right elongated edge;
   a plurality of cells, each including four of said plurality of plates interattached to form the walls thereof;
   each of said plurality of plates including a left tab attached to the left edge of said plate, a right tab attached to the right edge of said plate, said left tab and said right tab extending from the plane of said plate toward the rear thereof,
   a left tab extension attached to the rear edge of said left tab and extending toward the right of said plate;
   said right tab of each of said four plates of each of said cells being attached to the plate of the right thereof at the left side of the front surface of the base of said plate to the right thereof, to form, from the walls of said four plates, a right square prismatic compartment being open on both ends;
   said plurality of cells being arranged in an array to form a plurality of cavities, one between each pair of adjacent said cells, said cavities being capable of accepting a neutron absorbing material;
   a space at the intersection of four cells defined by the front surfaces of the left tab extensions of the four cells; and a bar positioned in said space to interlock the four cells.

* * * * *